15

(12) United States Patent
Brandenburg (10) Patent No.: US 9,858,581 B2
(45) Date of Patent: Jan. 2, 2018

(54) METHODS AND SYSTEMS FOR PROCESSING AD SERVER TRANSACTIONS FOR INTERNET ADVERTISING

(75) Inventor: John C. Brandenburg, Phoenix, MD (US)

(73) Assignee: Millennial Media LLC, Baltimore, MD (US)

( * ) Notice: Subject to any disclaimer, the term of this patent is extended or adjusted under 35 U.S.C. 154(b) by 505 days.

(21) Appl. No.: 13/546,603

(22) Filed: Jul. 11, 2012

(65) Prior Publication Data

US 2013/0019296 A1 Jan. 17, 2013

Related U.S. Application Data

(60) Provisional application No. 61/508,588, filed on Jul. 15, 2011.

(51) Int. Cl.
*H04L 29/06* (2006.01)
*G06Q 30/02* (2012.01)

(52) U.S. Cl.
CPC ......... *G06Q 30/02* (2013.01); *G06Q 30/0251* (2013.01); *G06Q 30/0267* (2013.01)

(58) Field of Classification Search
CPC . G06Q 30/02; G06Q 30/0251; G06Q 30/0267
USPC ............ 713/172; 726/5–7; 705/14.51, 14.65, 705/14.73
See application file for complete search history.

(56) References Cited

U.S. PATENT DOCUMENTS 6,188,398 B1 2/2001 Collins-Rector et al.
2008/0140529 A1 6/2008 Agarwal et al.
2009/0113468 A1* 4/2009 Steelberg ............... G06Q 30/02 725/32
2009/0319375 A1 12/2009 Dharmaji
2010/0138294 A1* 6/2010 Bussmann ............. G06Q 30/00 705/14.49
2010/0268599 A1 10/2010 Montesdeoca
(Continued)

FOREIGN PATENT DOCUMENTS

WO WO 02/091118 A2 11/2002

OTHER PUBLICATIONS

International Search Report and Written Opinion issued in International Patent Application No. PCT/US2012/046364 dated Oct. 9, 2012; 12 pages.

(Continued)

*Primary Examiner* — Ghodrat Jamshidi
(74) *Attorney, Agent, or Firm* — Shook, Hardy & Bacon L.L.P.

(57) ABSTRACT

Computer systems and methods for processing ad server transactions are provided. In some embodiments, the computer systems and methods may comprise determining an application to execute on an Internet-connectable device in response to a user interaction with an advertisement displayed on the Internet-connectable device; causing the Internet-connectable device to execute the application; receiving a security token, wherein the security token indicates successful authentication of the user by a transaction server associated with the application; after receiving the security token, initiating at least one transaction with the transaction server on behalf of the application in response to a user action within the application; and communicating results of the at least one transaction to the user.

22 Claims, 3 Drawing Sheets

(56) References Cited

U.S. PATENT DOCUMENTS

2010/0276484 A1* 11/2010 Banerjee et al. ............. 235/379
2012/0054741 A1* 3/2012 Ali et al. .......................... 718/1
2012/0315008 A1* 12/2012 Dixon .................... G06Q 30/00
    386/230

OTHER PUBLICATIONS

PCT Notification of the Recordation of a Change dated Oct. 8, 2012 in PCT/US2012/046364; 2 pages.

* cited by examiner

FIG. 3 ated in advertisements for diapers. Thus, to provide relevant advertisements, advertisers may require some information about the user to help identify unique interests of the user.

Typically, to determine a relevant advertisement for a user of an Internet-connectable device, device-specific data can first be communicated from the Internet-connectable device to a publisher server, advertisement server, or other server in the form of, for example, metadata. Device-specific data communicated to a publisher server may, in turn, be communicated to an advertising server or other server. The advertising server or other server may then perform advertisement analysis and decision-making. In addition to the device-specific data, a publisher server may store and communicate additional data useful in performing advertisement analysis and decision-making including, for example, user profile data, which may comprise gender, location, age, demographics, interests, user and/or device history, etc.

METHODS AND SYSTEMS FOR PROCESSING AD SERVER TRANSACTIONS FOR INTERNET ADVERTISING

RELATED APPLICATIONS

This application claims the benefit of U.S. Provisional Application No. 61/508,588, filed Jul. 15, 2011, which is hereby incorporated by reference herein. This application also hereby incorporates by reference herein U.S. Non-Provisional patent application Ser. No. 13/546,574, filed concurrently herewith.

TECHNICAL FIELD

The systems and techniques described herein relate generally to processing ad server transactions for Internet advertising.

BACKGROUND

Internet-connectable devices are ubiquitous in today's society. This is evidenced by the widespread use of personal electronic user devices, such as smartphones. In part, this is due to advancements in mobile network infrastructure, service offerings from multiple mobile network operators that give greater value to subscribers, reduced device manufacturing costs, and the fact that today's mobile devices can serve many functions beyond voice communication. For example, certain mobile devices may function as a mobile phone, a video camera, a portable media player, a Global Positioning System (GPS) device, and/or an Internet client with email and web browsing capabilities. Mobile devices may also provide proprietary and/or third-party software applications that offer various capabilities including, for example, games and social networking. Other Internet-connectable devices may provide the same or similar functions and capabilities due to similar advancements and offerings.

Internet-connectable devices may also allow users to conduct transactions such as, for example, commercial transactions. Commercial advertisers have responded to the influx of powerful and intelligent Internet-connected devices capable of conducting commercial transactions by increasingly marketing products and services via mobile advertising. Mobile advertising is a rapidly growing sector providing advertisers with the opportunity to connect with potential consumers via consumers' Internet-connectable devices, rather than, or in addition to, traditional media such as radio or television. Mobile advertising includes many channels through which consumers can be reached. These channels include, but are not limited to, web-browser clients, Short Message Service (SMS), Multimedia Messaging Service (MMS), games, videos, and software applications. Each mobile advertisement can link to additional content, channels, or, in some instances, complementing media.

Internet-connectable devices are ideal for targeted advertisements due to the fact that an Internet-connectable device is often associated with only one unique user. Moreover, many Internet-connectable devices give users the ability to be highly engaged with the content available thereon, including advertisements. Therefore, Internet-connectable devices can help deliver excellent advertisement campaign effectiveness and response levels compared to other media; however, to be most effective, advertisements must be relevant to the user of the Internet-connectable device. For example, people without children are unlikely to be inter-

SUMMARY

Computer systems and methods for processing ad server transactions are provided. In some embodiments, the computer systems and methods may comprise determining an application to execute on an Internet-connectable device in response to a user interaction with an advertisement displayed on the Internet-connectable device; causing the Internet-connectable device to execute the application; receiving a security token, wherein the security token indicates successful authentication of the user by a transaction server associated with the application; after receiving the security token, initiating at least one transaction with the transaction server on behalf of the application in response to a user action within the application; and communicating results of the at least one transaction to the user.

BRIEF DESCRIPTION OF THE DRAWINGS

The accompanying drawings, which are incorporated in and constitute a part of this specification, illustrate various embodiments of the systems and techniques, as described herein, and together with the description, serve to explain the principles of the systems and techniques. In the drawings.

DETAILED DESCRIPTION

Described herein are systems and techniques for processing ad server transactions. In some embodiments, an Internet-connectable device that requests an advertisement may be served an advertisement selected by an ad server based on a multitude of available information. In at least one embodiment, a user's interaction with the advertisement may result in additional content being provided to the user. For example, an application associated with the advertisement may be launched or a web browser may be directed to a particular website on the user's Internet-connectable device. If a user initiates a transaction via the additionally provided content, certain embodiments of the systems and techniques described herein may allow for the transaction to be processed by the ad server in communication with a transaction server.

Embodiments of the disclosed systems and techniques may provide a variety of benefits and features. For example, advertisers may be more interactive and personal with potential consumers by providing user-specific content in response to an interaction with an advertisement. The disclosed embodiments may also provide advertisers with additional means to market goods and services to users without having to modify advertiser applications much, if at all. Embodiments may additionally reduce the utilization of Internet-connectable device resources by offloading transactional processes to the ad server. Doing so may allow users of Internet-connectable devices to seamlessly complete transactions, thereby potentially decreasing the number of users who fail to complete such transactions due to encumbrances such as, for example, login requests.

Reference will now be made to accompanying figures. Occasionally, the same reference numbers may be used throughout the figures and the following description to refer to the same or similar parts. While several embodiments and features of the systems and techniques are described herein, modifications, adaptations, and other implementations are possible, without departing from the spirit and scope of the systems and techniques. For example, substitutions, additions, or modifications may be made to the components illustrated in the figures, and the methods described herein may be modified by substituting, reordering, or adding steps to the disclosed methods. Accordingly, the following detailed description is not intended to limit the systems and techniques to any specific embodiments or examples.

Figure 1:
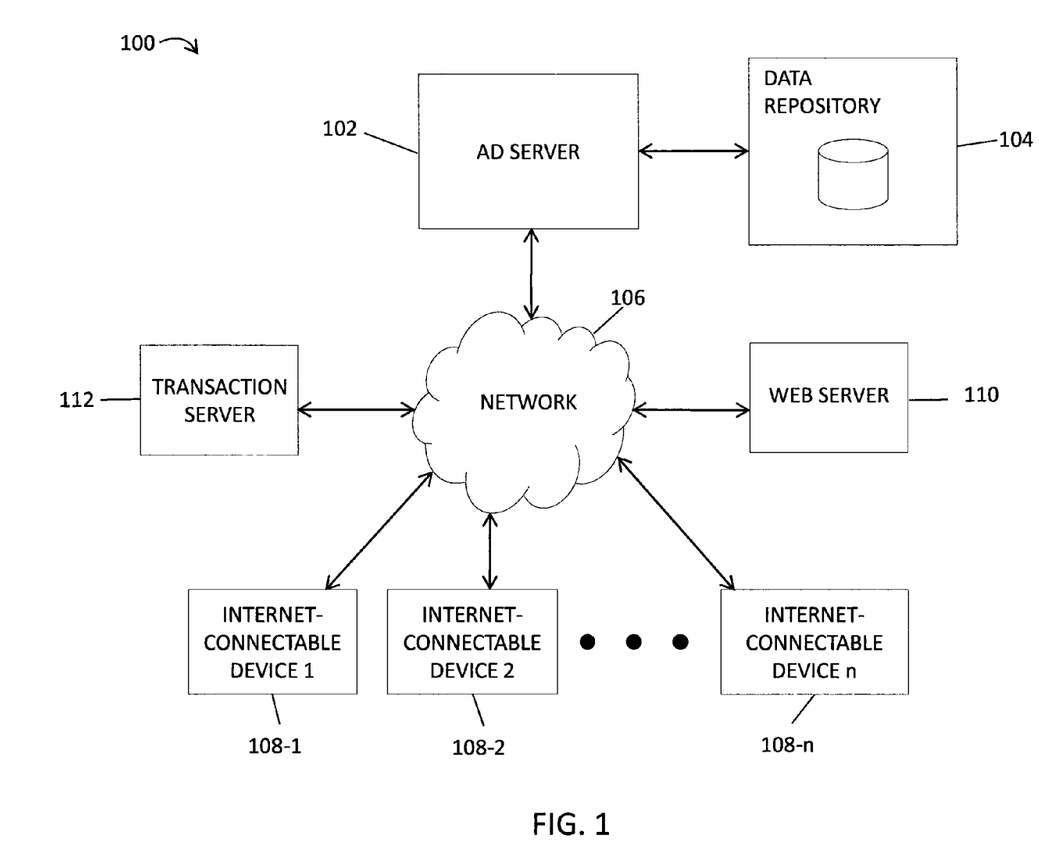
FIG. 1 illustrates a system that may be used with certain embodiments of the systems and techniques described herein.

FIG. 1 shows a block diagram of a system that may be used for processing ad server transactions. As shown in the embodiment of FIG. 1, system 100 may include an ad server 102, a data repository 104, Internet-connectable devices 108-1 through 108-n, a web server 110, and a transaction server 112. Ad server 102, Internet-connectable devices 108, web server 110, and transaction server 112 may communicate through network 106. Network 106 may be any one or more of a variety of networks or other types of communication connections as known to those skilled in the art. Network 106 may include a network connection, bus, or other type of data link, such as a hardwire or other connection known in the art. For example, network 106 may be the Internet, an intranet network, a local area network, or other wireless or other hardwired connection or connections by which ad server 102, Internet-connectable devices 108, web server 110, and transaction server 112 may communicate.

Ad server 102 may be, include, or be part of a technology and/or service that provides advertisements to, for example, Internet-connectable devices 108. In various embodiments, ad server 102 may include, for example, a general purpose computer, a server, a mainframe computer, a computer with a specific purpose of serving advertisements, or a combination of one or more thereof. For example, ad server 102 may be a computer server that stores advertisements and determines advertisements to be served to Internet-connectable devices 108. Ad server 102 may also perform data gathering and data analysis tasks such as, for example, counting the number of advertisement impressions or clicks. Often, ad servers are operated by advertisement network operators such as Millennial Media Corporation of Baltimore, Md.

Web server 110 may be, include, or be part of a technology and service that provides webpages or other content to requesting entities such as, for example, Internet-connectable devices 108. Webpages may be provided as HyperText Markup Language (HTML) documents or any other type of data that may be used to create webpages. Webpages may include images, videos, text, advertisements, or other content that is suitable for the World Wide Web and can be accessed through a web browser on a Internet-connectable device. In various embodiments, web server 110 may include, for example, a general purpose computer, a server, a mainframe computer, a computer with a specific purpose of providing webpages, or a combination of one or more thereof. Web server 110 may be owned and/or operated by a content provider, publisher, or domain name controller and may store webpages and other content associated with one or more domain names or other content sources. A content provider or publisher typically engages viewers with content such as, for example, news or entertainment.

Transaction server 112 may be, include, or be part of a technology and service that is used to, for example, authenticate users and/or process transactions. A transaction may include, for example, a purchase, a data request, a resource access request, and/or any other request for the exchange of data. In various embodiments, transaction server 112 may include, for example, a general purpose computer, a server, a mainframe computer, a computer with a specific purpose of authenticating users or processing transactions, or a combination of one or more thereof. Transaction server 112 may be owned and/or operated by a product or service provider or a third-party. In certain embodiments, web server 110, ad server 102, and/or transaction server 112 may be provided by the same party.

Internet-connectable devices 108 may be, include, or be part of any entity that is capable of requesting and presenting advertisements to one or more users. In many embodiments, an Internet-connectable device may be identifiable as a device uniquely associated with a user. For example, Internet-connectable device 108-1 may be a personal computer with Internet access that is uniquely identifiable by an Internet Protocol (IP) address or by an Internet cookie stored on the personal computer. Internet-connectable device 108-2 may be a smartphone that is uniquely identifiable by, for example, an International Mobile Equipment Identity number. Other Internet-connectable devices may include, for example, television set-top boxes, tablet computers, portable media devices, appliances, websites, and gaming consoles. It should be noted that in some embodiments an Internet-connectable device may comprise more than one entity. For example, an Internet-connectable device may be a set of smartphones associated with a user.

Advertisement requests may be initiated from, for example, a web browser, a software application, or other software component of an Internet-connectable device. In many cases, such requests may be generated in response to a user action. For example, a user may go to a specific website, which triggers an advertisement request; a user may launch an application, which may trigger an advertisement request either at launch or at some other predetermined time; or a user may perform an action within an application, which triggers an advertisement request. In other cases, a user may not be actively engaged with the Internet-connectable device but an agent (e.g., a software application) on the device automatically requests an advertisement. For example, digital displays on refrigerators can request an advertisement without user intervention. It should be noted that similar systems and techniques may apply to other Internet-connectable devices.

Data repository 104, which may be communicatively connected to, or part of, ad server 102, may include one or more files and/or relational and/or non-relational databases that store information that may be accessed, used, and/or managed by ad server 102. Data repository 104 may be, include, or be part of any logical and/or physical data storage solution. For example, data repository 104 may include one or more data storage devices for storing data. As specific examples, data repository 104 may include volatile or non-volatile, magnetic, semiconductor, tape, optical, removable, non-removable, or other types of storage or computer-readable media. In some embodiments, data repository 104 may store, for example, information associated with Internet-connectable devices 108 and associated users gathered by, and/or communicated to, ad server 102. The same or similar data may also be stored in ad server 102 or one or more other data repositories.

Figure 2:
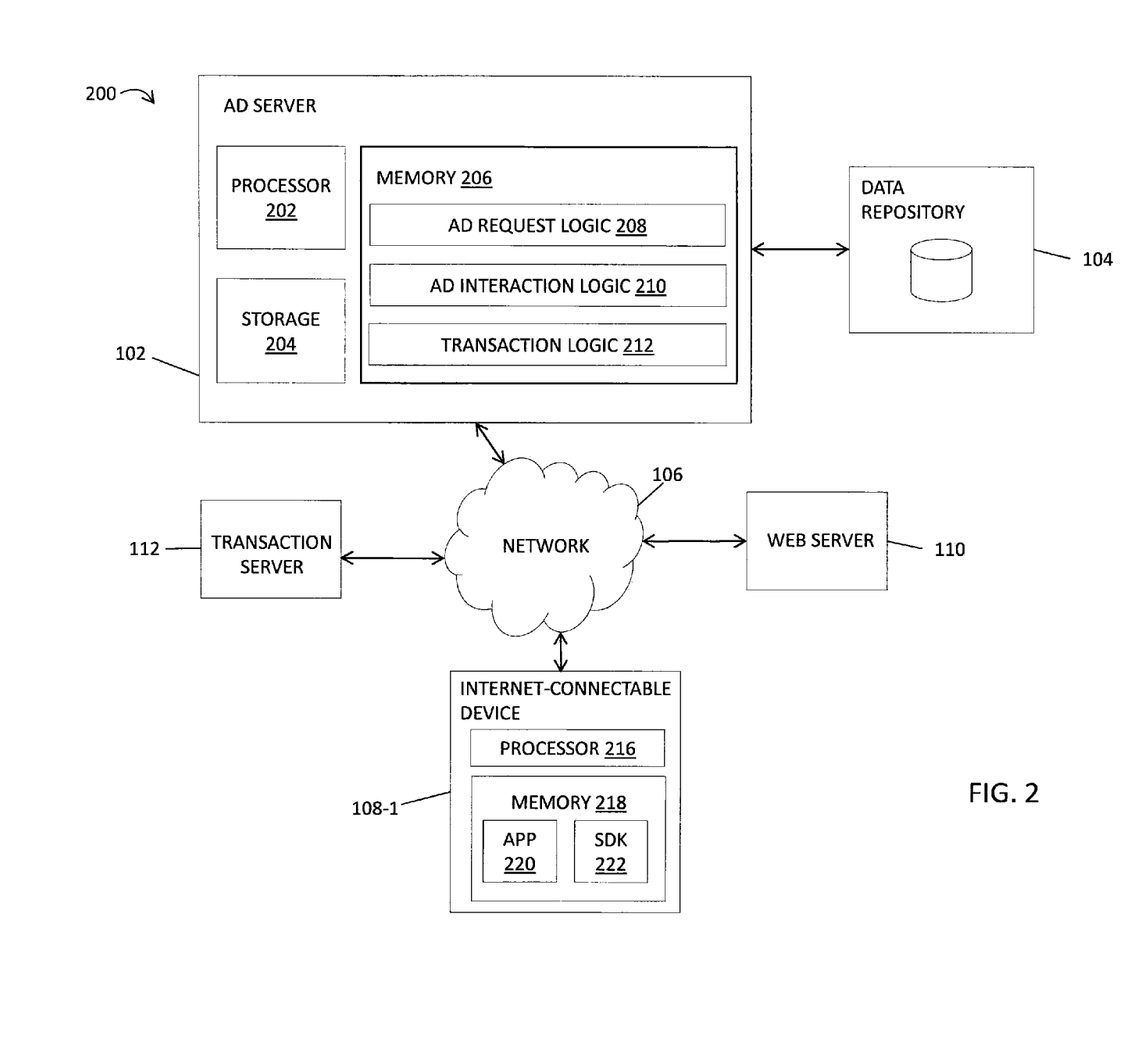
FIG. 2 illustrates a system that may be used with certain embodiments of the systems and techniques described herein.

FIG. 2 shows a block diagram illustrating components of a system that may be used for processing ad server transactions. As shown in the embodiment of FIG. 2, ad server 102 may include a processor 202, storage 204, memory 206, and input/output (I/O) devices (not shown). Internet-connectable device 108-1 may include a processor 216 and memory 218.

With reference to ad server 102, processor 202 may be one or more known processing devices such as, for example, a microprocessor, a microcontroller, an application-specific integrated circuit (ASIC), a field programmable gate array (FPGA) or other type of processing circuitry, as well as portions or combinations of such circuitry elements. Storage 204 may be, include, or be part of volatile or non-volatile, magnetic, semiconductor, tape, optical, removable, non-removable, or other types of storage or computer-readable media.

In some embodiments, memory 206 may include software loaded from storage 204 and executed by processor 202 to perform one or more processes consistent with the systems and techniques disclosed herein. In a particular embodiment, memory 206 may include ad request logic 208, ad interaction logic 210, and transaction logic 212. Memory 206 may also include other programs and logic that perform other processes such as, for example, programs that provide communication support. Memory 206 may also be configured with an operating system (not shown) that performs functions well known in the art when executed.

With reference to Internet-connectable device 108-1, memory 218 may include software executed by processor 216 to perform one or more processes consistent with the systems and techniques disclosed herein. For example, memory 218 may include application 220 and advertiser SDK 222. Processor 216 may be one or more known processing devices such as, for example, a microprocessor, a microcontroller, an application-specific integrated circuit (ASIC), a field programmable gate array (FPGA) or other type of processing circuitry, as well as portions or combinations of such circuitry elements.

Application 220 may be any software application capable of initiating advertisement requests and/or displaying advertisements. For example, component 220 may be an advertiser's software application. In certain embodiments, source 108-1 may request advertisements from ad server 102, and/or other servers, for the purpose of displaying advertisements, for example, within application 220. For example, a user of source 108-1 may perform an action that triggers the loading of application 220, which in turn may request an advertisement from ad server 102.

Advertiser SDK 222 may be an advertiser software development kit (SDK) provided by, for example, an advertisement network operator. In some embodiments, advertiser SDK 222 may be used to help achieve the systems and techniques as described herein. For example, functions of advertiser SDK 222 may be invoked to communicate with ad server 102 or to launch application 220.

Memory devices 206 and 218 may each be viewed as an example of what is more generally referred to herein as a "computer program product" having executable computer program code in accordance with discussed systems and techniques embodied therein such as, for example, ad interaction logic 210. Such memories may comprise electronic memories such as random access memory (RAM), read-only memory (ROM), or other types of memory, in any combination. One skilled in the art would be readily able to implement such computer program code given the teachings provided herein. Other examples of computer program products embodying aspects of the invention may include, for example, optical or magnetic disks.

Web server 110 may also include a processor, storage, and memory. The memory may include one or more web server programs for receiving and responding to, for example, HyperText Transfer Protocol (HTTP) requests and one or more server-side scripts for providing dynamic webpages. Each such program, for example, may be loaded from storage.

It should be noted that the particular examples of the hardware and software that may be included in systems 100 and 200 are described herein in more detail, and may vary with each particular embodiment. For example, systems in accordance with the systems and techniques such as systems 100 and 200 may comprise more or fewer than one of each of the components specifically shown in FIGS. 1 and 2. Thus, it is to be appreciated that given embodiments of systems 100 and 200 may include multiple instances of ad server 102, data repository 104, web server 110, and transaction server 112, and in regards to system 200, multiple instances of processor 202 and 216, memory 206 and 218, storage 204, ad request logic 208, ad interaction logic 210, transaction logic 212, application 220, and advertiser SDK 222, although only single instances of such components are shown in simplified system diagrams 100 and 200 for clarity of illustration. Other software and/or hardware components of a type known to those skilled in the art may also or instead be incorporated into systems 100 and 200.

It should also be noted that in some embodiments, functionalities and data provided by the components shown in systems 100 and 200 may be provided by other components shown or not shown in systems 100 and 200. For example, ad server 102 may additionally provide the same or similar functionalities as provided by web server 110.

Figure 3:
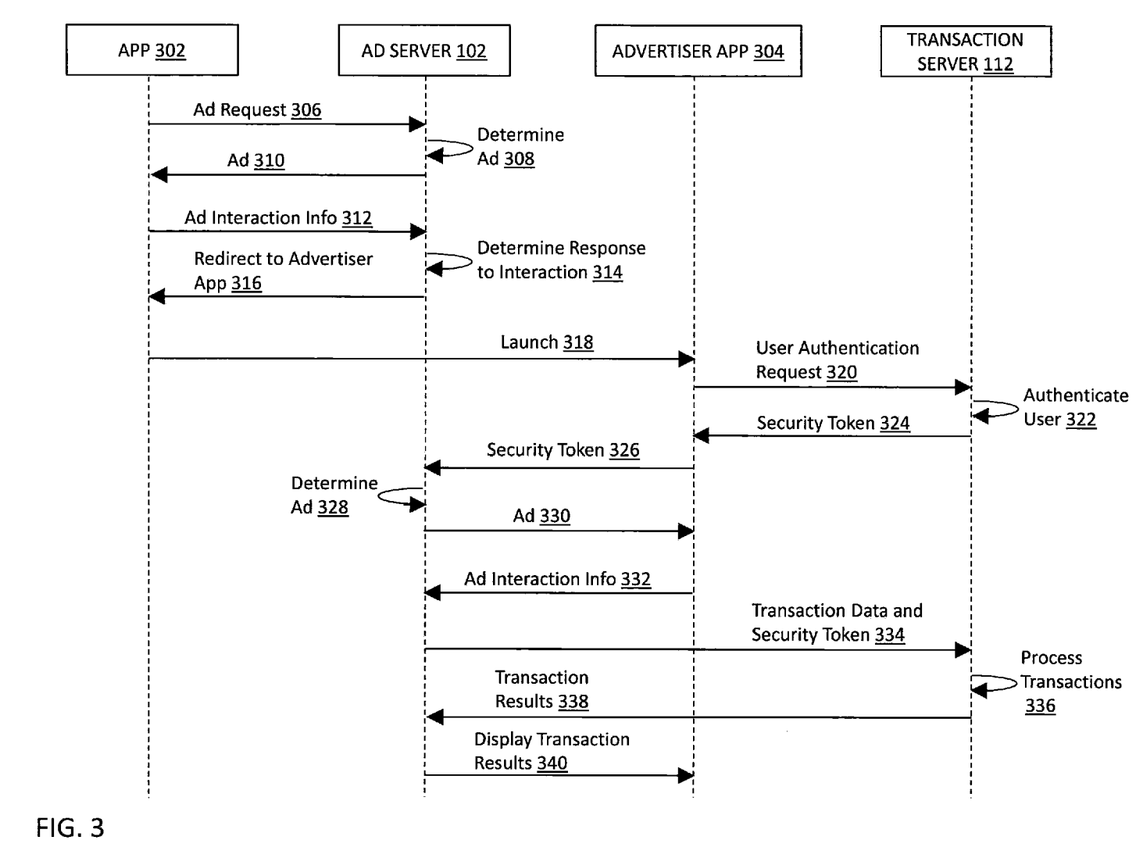
FIG. 3 illustrates a sequence diagram that may be used with certain embodiments of the systems and techniques described herein.

FIG. 3 shows a sequence diagram 300 illustrating process steps that may be used with certain embodiments of the systems and techniques described herein. In some embodiments, the process steps illustrated by diagram 300 may be used to seamlessly launch, for example, an application or web page in response to a user's interaction with an advertisement in such a way that the user is pre-authorized to quickly and easily complete commercial transactions from within the launched application. The process steps illustrated in diagram 300 involve interactions between various components that may be used in some embodiments of the systems and techniques including an application 302 executing, for example, on Internet-connectable device 108-1; ad server 102; and an advertiser application 304 executing, for example, on Internet-connectable device 108-1 or a different Internet-connectable device, and transaction server 112. Alternative embodiments may include additional and/or different components, additional and/or different process steps, or additional or different Internet-connectable devices.

In step 306, application 302 executing on Internet-connectable device 108-1, which may be uniquely associated with a user, may cause a request for an advertisement to be sent to ad server 102. In another embodiment, a website capable of uniquely identifying a user may cause a request for an advertisement to be sent to ad server 102. Application 302 may be a software application developed by, for example, an advertiser, the manufacturer of Internet-connectable device 108-1, an entertainment software provider, an educational software provider, an enterprise software provider, a media software provider, etc. Application 302 may be, for example, preinstalled on Internet-connectable device 108-1, downloaded onto Internet-connectable device 108-1 by the user, etc.

Advertisement requests may be processed in a multitude of ways. For example, in an embodiment where application 302 initiates an advertisement request, functions of advertiser SDK 222, which may be embedded in, or interfaced to, application 302, may be invoked to communicate advertisement requests, among other data, with ad server 102. In another embodiment, JavaScript, or other programming languages, may be used to communicate with ad server 102. In some embodiments, the advertisement request may first be received by one or more intermediate servers such as, for example, web server 110, before being received by ad server 102.

In some embodiments, an advertisement request may include data to enable ad server 102 to determine a relevant advertisement to be served to Internet-connectable device 108-1 in response to the advertisement request. In an embodiment where the advertisement request is first received by one or more intermediate servers, the one or more intermediate servers may also provide such data to ad server 102 alone or as part of the advertisement request. For example, an advertisement request may include user-specific and/or device-specific data, among other data. A particular example of device-specific data may include device-identifying information allowing ad server 102 to identify Internet-connectable device 108-1 from which the advertisement request originated. Other examples of device-specific data that may be passed to ad server 102 may include the current or historical geographical location or locations of Internet-connectable device 108-1 (e.g., GPS location) and/or demographics associated with Internet-connectable device 108-1 (e.g., service provider). A particular example of user-specific data may include user-identifying information allowing ad server 102 to identify the user of Internet-connectable device 108-1. Other examples of user-specific data that may be passed to ad server 102 may include information pertaining to the user's interests (e.g., sports fan) and other psychographic and social data applicable to the user, and/or historical user behaviors (e.g., historical Internet activity, frequency of use of an application, history of advertisement interactivity, purchase history).

In some embodiments, at least some data may be provided by the user of Internet-connectable device 108-1, for example, upon installation of application 302, during use of application 302, when signing up for a service, when visiting a website, or at some other point in time. Additionally, or alternatively, data may be determined by, for example, Internet-connectable device 108-1, application 302, advertiser SDK 222, and/or one or more intermediate servers, based on, for instance, historical behaviors of the user. In certain embodiments, such data may instead or also be obtained from other sources such as, for example, a public database. In some embodiments, as described further below, ad server 102 may additionally, or alternatively, be capable of retrieving and/or determining such data.

In step 308, ad server 102 may determine one or more relevant advertisements to be served to Internet-connectable device 108-1 in response to the advertisement request. Example advertisements may include coupon codes, text, pictures, and/or video concerning an organization, a product, a service, an event, etc. It should be noted that advertisements, as referred to herein, may encompass any offer or information that may be displayed to a user. In some embodiments, the determination of one or more relevant advertisements may be made by logic executing on ad sever 102 such as, for example, ad request logic 208 as shown in FIG. 2.

Ideally, the determination of step 308 results in the selection of an advertisement that is enticing to the user of Internet-connectable device 108-1 and that invokes a user interaction with the advertisement. However, in some cases, there may exist no data upon which to determine such an advertisement. In these cases, in some embodiments, a generic and/or default advertisement may be served to Internet-connectable device 108-1. In other cases, device- and/or user-specific data, which may be included with the advertisement request, alone or in combination with other data used and/or determined by ad server 102, may be used to help determine a relevant advertisement.

Data used and/or determined by ad server 102 may include device-specific data such as, for example, current or historical geographical location or locations of Internet-connectable device 108-1 and/or demographics associated with Internet-connectable device 108-1. Data used and/or determined by ad server 102 may include user-specific data such as, for example, information pertaining to the user's interests or historical activities. In some embodiments, a user's interests and/or historical activities, and possibly other user- and/or device-specific data, may be used to determine an appropriate "audience" into which the user may be enrolled. An audience may be, for example, an aggregation of interests, histories, and/or affinities that are combined to form a single entity with which users may be associated. For instance, an audience into which a user may be enrolled may be determined based on historical geographical location data, applications installed on the user's Internet-connectable device, data collected by such applications, etc. An example audience may be "auto intenders," which includes users interested in purchasing an automobile. Another example audience may be "sports fans," which includes users whom are sports fans. The use of audiences may facilitate a more successful advertisement campaign due to the commonalities between users associated with an audience and because advertisements related to those commonalities will most likely be relevant to all users associated with the audience.

As a specific example, historical geographical location data indicating that a user's device has been located within a sports venue, the existence of sports-related applications on the user's device, and/or the user's actions within the sports-related applications may alone or together signify that the user has an interest in baseball. As a result, the user may be enrolled into a "baseball fans" audience. Advertisements intended for the user may then be drawn from a pool of advertisements relevant to this audience.

In some cases, at least some user-specific data may be received from, for example, a publisher or advertiser and stored in a data repository (e.g., data repository 104 of FIG. 2) for later use by ad server 102. In certain embodiments, ad server 102 may also be able to determine user-specific data based on, for instance, actions performed by the user. For example, based on, for instance, other advertisement requests or data provided to ad server 102 via advertiser SDK 222 on Internet-connectable device 108-1, ad server 102 may track applications a user has interacted with, details about such interactions, websites visited by the user, and other user actions, to determine an audience with which the user is associated. Often, the tracking and/or use of such data is only performed if the user is opted into behavioral analysis and/or interest-based advertisement targeting.

In step 310, the advertisement determined by ad server 102 to be most relevant to the user of the Internet-connectable device may be served to Internet-connectable device 108-1 to be displayed by application 302, or in some embodiments, a website. In some embodiments, step 308 may involve determining more than one relevant advertisement to be served to Internet-connectable device 108-1 in step 310. In these embodiments, one or more of the served advertisements may be stored within Internet-connectable device 108-1. Thus, subsequent advertisement requests may be served directly by Internet-connectable device 108-1 rather than by a server communicatively connected to Internet-connectable device 108-1 via the Internet or other medium. These embodiments may also allow for advertisements to be displayed regardless of whether or not Internet-connectable device 108-1 is connected to the Internet at the time an advertisement is requested. In some embodiments, logic on Internet-connectable device 108-1 may help determine which one of the stored advertisements should be displayed on Internet-connectable device 108-1.

In step 312, data related to a user interaction with the advertisement may be communicated to ad server 102. A typical user interaction may be selecting (e.g., using a finger or mouse pointer) an advertisement displayed to a user of Internet-connectable device 108-1. Other interactions may include, for example, swiping a finger across a touchscreen upon which the advertisement is displayed, shaking Internet-connectable device 108-1, moving Internet-connectable device 108-1 in a particular motion, etc. In some embodiments, data related to the user interaction may include, for example, the occurrence of the user interaction with the advertisement, data associated with the advertisement, device-specific data associated with Internet-connectable device 108-1 upon which the interaction occurred (e.g., the geographical location of Internet-connectable device 108-1 at the time of the advertisement interactivity), and/or user-specific data associated with the interacting user.

In step 314, ad server 102 may determine an appropriate response to the user action based on, in some embodiments, device-specific data, user-specific data, and/or data related to the user interaction with the advertisement. In some embodiments, the determination may be made by logic executing on ad sever 102 such as, for example, ad interaction logic 210 shown in FIG. 2. In some embodiments, the device- and/or user-specific data considered by ad server 102 in determining an appropriate response to the user action may be the same or similar to the device- and/or user-specific data considered in the determination of step 308 discussed above. Also, in some embodiments, the device- and/or user-specific data may be received, used, or determined in a similar manner as the data considered in the determination of step 308.

In certain embodiments, the appropriate response to the user action may be to cause Internet-connectable device 108-1 to invoke, for example, the most appropriate entity to handle a transaction or service, or an entity related to the advertisement with which the user interacted. For example, Internet-connectable device 108-1 may be caused to launch advertiser application 304, which may be provided by an advertiser. Another appropriate response may be to cause a web browser on Internet-connectable device 108-1 to be directed to a particular website hosted by, for example, an advertiser or an advertisement network operator.

It should be noted that the user interaction may, in some embodiments, be handled by Internet-connectable device 108-1, application 302, or advertiser SDK 222 rather than by ad server 102. In these embodiments, Internet-connectable device 108-1, application 302, or advertiser SDK 222 may determine the appropriate response to the action. For example, similar to the determination made by ad server 102 in step 314, it may be determined by Internet-connectable device 108-1 that an advertiser's application should be loaded on Internet-connectable device 108-1 or a web browser executing on Internet-connectable device 108-1 should be directed to a particular website.

In step 316, Internet-connectable device 108-1 may be caused to respond in the way deemed appropriate by ad server 102 in step 314. For example, ad server 102 may communicate instructions to application 302 or advertiser SDK 222 to perform an action. As a specific example, if the appropriate response is to cause Internet-connectable device 108-1 to load advertiser application 304, in step 318, functions of advertiser SDK 222 on Internet-connectable device 108-1 may be invoked in response to instructions received by Internet-connectable device 108-1 from ad server 102 to cause advertiser application 304 to be loaded. As another specific example, ad server 102 may communicate instructions to application 302 to load a particular website in a web browser executing on Internet-connectable device 108-1.

In certain embodiments, application 302 and/or advertiser SDK 222 may pass data to advertiser application 304 upon or subsequent to launch of advertiser application 304, including any device- and/or user-specific data determined by, received by, and/or otherwise available to application 302 and/or advertiser SDK 222. For example, data passed to application 304 may include data received by advertiser SDK 222 from ad server 102. In some embodiments, data passed to advertiser application 304 may be included with advertisement requests initiated by advertiser application 304 or it may be used to customize advertiser application 304 for the user of Internet-connectable device 108-1. Similar data may also be passed to a website launched in response to a user interaction with an advertisement.

In step 320, upon or subsequent to launch of advertiser application 304 in step 318, advertiser application 304 may automatically request that the user be authenticated by transaction server 112; and, in step 322, transaction server 112 may authenticate the user. In some embodiments, authentication may instead be automatically requested by a website or advertiser SDK 222. In addition to authenticating the user, authentication may also include, for example, tracing the origin of the authentication request and/or assuring that application 304 and/or Internet-connectable device 108-1 is trusted. A common authentication request may include credentials, such as, for example, a user name and password pair uniquely associated with the user that are compared to credentials stored in a server, such as authentication server 112. In some embodiments, credentials may be temporarily or permanently stored on Internet-connectable device 108-1 by, for example, advertiser application 304, or advertiser SDK 222, for later use in authenticating the user. In certain embodiments, a successful authentication may be cached such that a user need not be authenticated each time advertiser application 304 is launched. In some cases, although credentials may be stored or a successful authentication may be cached, a user may occasionally need to provide information for authentication. Other means known to those skilled in the art for authenticating a user may also or instead be used in embodiments of the systems and techniques described herein.

Often, user name and password pairs, or other means for authenticating a user, are created when an application, such as advertiser application 304, is downloaded and installed and the user, for example, registers for a service or purchases a product provided via the application. In some cases, a user name and password pair is created upon the first attempt to access a service or purchase a product. In other cases, a user may create a user name and password pair upon signing up for a service via, for example, a website, email, or telephone.

In step 324, if the user is authenticated, transaction server 112 may issue a security token to advertiser application 304, which may in turn provide the security token to ad server 102 in step 326. Advertiser application 304 may provide the security token to ad server 102 by utilizing functions of advertiser SDK 222 on Internet-connectable device 108-1. In some embodiments, security tokens are generated by transaction server 112. Also, in certain embodiments, transaction server 112 may issue a security token directly to ad server 102.

A security token is a security device used to give authorized users access to an entity or resource by acting as proof that the user has been successfully authenticated. For example, when attempting to communicate with transaction server 112, ad server 102 may present the issued security token received from advertiser application 304 to transaction server 112, which may verify that the token was properly issued. If it is determined that the token was properly issued, transaction server 112 may trust that the token holder has been successfully authenticated. Thus, a security token may be used, in some cases, to perform secure transactions between entities. For example, completing a commercial transaction with transaction server 112 may require the communication of a properly issued security token that can be used to encrypt messages. It should be noted that in some embodiments other means of proving successful authentication may be utilized such as, for example, a session identifier, or one or more variables.

In at least one embodiment, when the security token is passed to ad sever 102, ad server 102 may complete, for example, one or more transactions with transaction server 112 on behalf of advertiser application 304 using, for example, transaction logic 212 shown in FIG. 2. In this embodiment, advertiser application 304 may not need to communicate with transaction server 112 to complete a transaction apart from possibly authenticating the user in step 320. As a result, advertiser application 304 may not need to include complex logic required to perform such transactions. Rather, by using, for example, advertiser SDK 222, advertiser application 304 may communicate information used to complete a transaction to ad server 102, thereby offloading transactional processes to ad server 102.

In some embodiments, in addition to passing the security token to ad server 102 in step 326, advertiser application 304 may also pass device- and/or user-specific data, as described above, to ad server 102. In certain embodiments, advertiser application 304 may provide the data by utilizing functions of advertiser SDK 222. The device- and/or user-specific data passed to ad server 102 may be any data determined by, received by, and/or otherwise available to advertiser application 304. As explained further below, in some embodiments, such data may be used to provide, for example, a customized transaction confirmation page and/or targeted advertisements to the user of Internet-connectable device 108-1.

In steps 328 and 330, ad server 102 may determine one or more advertisements and serve them to advertiser application 304 for display to the user of Internet-connectable device 108-1. In many embodiments, such advertisements may be selected and served by ad server 102 in a similar manner as the advertisements selected in step 308. In some embodiments, an advertisement may be determined, for example, in conjunction with the determination of the appropriate response in step 314 and passed along with instructions communicated to application 302. In another embodiment, the advertisement may be determined by ad server 102 in response to an advertisement request initiated upon launch of advertiser application 304 or a website, or in response to a subsequent triggering event associated with advertiser application 304 or the website. In yet another embodiment, the advertisement may be selected from one or more advertisements stored on Internet-connectable device 108-1 by advertiser SDK 222 or advertiser application 304.

In step 332, as a result of the user interacting with the advertisement served in step 330, information related to the user interaction with the advertisement may be communicated to ad server 102, for example, by advertiser SDK 222. As described elsewhere herein, a user interaction may be, for example, selecting (e.g., using a finger or mouse pointer) an advertisement displayed to a user of Internet-connectable device 108-1, swiping a finger across a touchscreen upon which the advertisement is displayed, shaking Internet-connectable device 108-1, moving Internet-connectable device 108-1 in a particular motion, etc. In some embodiments, data related to the user interaction may include, for example, the occurrence of the user interaction with the advertisement, data associated with the advertisement, device-specific data associated with Internet-connectable device 108-1 upon which the interaction occurred, and/or user-specific data associated with the interacting user.

In some embodiments, interacting with the advertisement served in step 330 indicates an intent to conduct a transaction. A transaction may be a commercial transaction (e.g., purchase a product or service), a data request (e.g., a request for banking information or media), a resource access request (e.g., a request for access to stored files), a social media transaction (e.g., posting a message online), or any other activity that requires the exchange of information between ad server 102 and transaction server 112. In these embodiments, in step 334, transaction data and the security token may be communicated to transaction server 112. As mentioned above, the security token may be used by transaction server 112 to verify that the user has been successfully authenticated by server 112 and/or it may be used to encrypt data communicated to transaction server 112. Transaction data may include, for example, any data required to complete a transaction. For instance, transaction data may include data identifying a product or service to be purchased (e.g., in the case of a commercial transaction), device- and/or user-specific data, and/or any additional data required to complete the intended transaction.

In step 336, transaction server 112 may process the intended transaction based on the transaction data. Transaction server 112 may communicate results of step 336 to ad server 102 in step 338. In step 340, ad server 102 may cause results of the transaction to be communicated to the user of Internet-connectable device 108-1. For example, in some cases, ad server 102 may cause advertiser application 304 to display results of the transaction. In other cases, a specific application may be launched, a website may be loaded in a web browser, or an interstitial window may be displayed on Internet-connectable device 108-1, any of which may inform the user of the results of the transaction. As a specific example, results may be displayed in the form of a confirmation page. In yet other cases, results may be communicated to the user via, for example, SMS, MMS, email, or a tweet. It should be noted that in some embodiments, causing results of the transaction to be displayed to the user may be achieved by ad server 102 causing functions of advertiser SDK 222 to be invoked.

In some embodiments, device- and/or user-specific data determined by, received by, and/or otherwise available to, for example, ad server 102 or advertiser SDK 222 may be used to customize the results communicated to the user. For example, a confirmation page may include the user's name in addition to the transaction result. In certain embodiments, such data may also be used by, for example, ad server 102 or advertiser SDK 222 to determine and serve an advertisement along with the results. For example, an advertisement may be displayed to the user that is associated with the transaction for which the results were communicated. In another embodiment, such data may be used to customize the order for which the results were communicated. For example, if a hat is purchased, the confirmation page may present the option to customize the hat with the user's initials.

What follows now are examples in accordance with certain embodiments of the disclosed systems and techniques. The examples are provided merely as illustrations and are not intended to limit the disclosed systems and techniques.

As one example, a smartphone user may have an application installed on the smartphone that provides information associated with nearby businesses. The application may include or be interfaced with an advertiser SDK that may be used to help achieve the systems and techniques as described herein. Based on data associated with the user and the user's smartphone, an advertisement asking if the user would like to buy coffee at a nearby coffee shop may be selected and served to the device by an advertisement server. If the user responds to the advertisement, the advertisement server may be informed of the user's interaction with the advertisement, determine that an application specific to the coffee shop should be launched on the smartphone, and communicate instructions to the smartphone to launch the coffee shop's application. The coffee shop's application may display drinks and food items that may be purchased by the user by selecting a corresponding image of a drink or food item. The drinks and food items to be displayed to the user may be determined by the advertisement server based on data associated with the user and/or the user's smartphone.

Upon launch, the coffee shop's application may automatically authenticate the user against a transaction server using credentials stored on the smartphone. The credentials may have been created when the user installed the coffee shop's application and provided information necessary for purchasing products via the application (e.g., name, address, credit card information). Once authenticated, the transaction server may pass a security token back to the coffee shop's application, which may then pass the security token to the advertisement server. If the user selects a food or drink item, the advertisement server will be notified and will communicate with the transaction server to complete the purchase transaction. Once the transaction is complete, the user may be notified that the purchase was successful and that the coffee shop is preparing the order. The notification may also include additional advertisements. For example, the advertisement server may determine an advertisement to be displayed to the user that is associated with a food item often consumed by the user and provided by the coffee shop, or a coupon may be displayed for a drink for a companion, or for a nearby doughnut shop.

As another example, a tablet computer user may have a sports application installed on the tablet computer. The tablet may include or be interfaced with an advertiser SDK that may be used to help achieve the systems and techniques as described herein. Based on data associated with the user and the user's tablet, an advertisement for sports memorabilia may be selected and served to the device by an advertisement server. If the user interacts with the advertisement, the advertisement server may be informed of the user's interaction with the advertisement, determine that a shopping application should be launched on the smartphone, and communicate instructions to the smartphone to launch the shopping application. Based on data associated with the user and/or the user's tablet, the advertisement server may determine what products to display to the user in the shopping application. For example, the shopping application may present the user with sports memorabilia associated with a team located near the user or with a team based on historical commercial transactions of the user.

Upon launch, the shopping application may automatically authenticate the user against a transaction server using credentials stored on the smartphone. The credentials may have been created when the user first purchased a product using the shopping application, which required the user to provide information necessary for purchasing products via the application. Once authenticated, the transaction server may pass a security token back to the shopping application, which may then pass the security token to the advertisement server. If the user selects a sports item for purchase, the advertisement server will be notified and will communicate with the transaction server to complete the purchase transaction. Once the transaction is complete, the user may be notified that the purchase was successful via a confirmation page displayed by the shopping application. The confirmation page may also display advertisements for other items related to the user's purchase.

The foregoing description of the systems and techniques, along with associated embodiments, has been presented for purposes of illustration only. It is not exhaustive and does not limit the systems and techniques to the precise form disclosed. Those skilled in the art will appreciate from the foregoing description that modifications and variations are possible in light of the above teachings or may be acquired from practicing the systems and techniques. For example, the steps described need not be performed in the same sequence discussed or with the same degree of separation. Likewise, various steps may be omitted, repeated, or combined, as necessary, to achieve the same or similar objectives. Accordingly, the spirit and scope of the systems and techniques described herein should be limited only by the following claims.

What is claimed is:

1. An ad server for processing ad server transactions, the ad server comprising:
   a processor; and
   a memory coupled to the processor, the memory storing instructions to cause the processor to perform operations comprising:
   receiving, on the ad server, data that corresponds to a selected advertisement displayed on an Internet-connectable device that is remote from the ad server, wherein the selected advertisement corresponds to a particular advertiser;

communicating, from the ad server, instructions to the Internet-connectable device in response to the received data, wherein the Internet-connectable device is configured to execute thereon, based on the communicated instructions, an application that is specific to the particular advertiser, and wherein the application is configured to send stored authentication credentials to a transaction server upon execution thereof;

receiving, from the Internet-connectable device, a security token necessary to process transactions on the transaction server, wherein the Internet-connectable device is configured to obtain the security token from the transaction server in response to a successful authentication of the stored authentication credentials sent from the Internet-connectable device to the transaction server via the application;

utilizing the security token to process, via the ad server, a transaction on the transaction server on behalf of the application; and communicating results of the processed transaction to the Internet-connectable device.

2. The ad server of claim 1, wherein the processor is further caused to perform the operation of:
serving the advertisement to the Internet-connectable device.

3. The ad server of claim 1, wherein the selected advertisement is displayed on the Internet-connectable device based on at least one of device-specific data or user-specific data.

4. The ad server of claim 3, wherein the device-specific data includes at least one of data identifying the Internet-connectable device or location data associated with the Internet-connectable device.

5. The ad server of claim 3, wherein the user-specific data includes at least one of data identifying the user, psychographic data associated with the user or historical behavior of the user.

6. The ad server of claim 3, wherein the selected advertisement is displayed on the Internet-connectable device based on at least one of advertisement interaction data, the device-specific data, or the user-specific data.

7. The ad server of claim 1, wherein the application automatically sends an authentication request to a transaction server upon being executed.

8. The ad server of claim 1, wherein the security token is received from the application using a software development kit incorporated in the Internet-connectable device.

9. The ad server of claim 1, wherein the security token is generated by a transaction server corresponding to the application.

10. The ad server of claim 1, wherein the Internet-connectable device is configured to execute thereon a second application that is specific to a second advertiser.

11. The ad server of claim 1, wherein the application is an advertiser application that corresponds to the particular advertiser of the selected advertisement.

12. A method for processing ad server transactions, the method comprising:
receiving, on an ad server, data that corresponds to a selected advertisement displayed on an Internet-connectable device that is remote from the ad server, wherein the selected advertisement corresponds to a particular advertiser;

communicating, from the ad server, instructions to the Internet-connectable device in response to the received data, wherein the Internet-connectable device is configured to execute thereon, based on the communicated instructions, an application that is specific to the particular advertiser, and wherein the application is configured to send stored authentication credentials to a transaction server upon execution thereof;

receiving, from the Internet-connectable device, a security token necessary to process transactions on the transaction server, wherein the Internet-connectable device is configured to obtain the security token from the transaction server in response to a successful authentication of the stored authentication credentials sent from the Internet-connectable device to the transaction server via the application;

serving, via the ad server, a second advertisement to the Internet-connectable device for display the application based on user-specific data;

utilizing the security token to process, via the ad server, a transaction on the transaction server on behalf of the application; and communicating results of the at least one processed transaction to the Internet-connectable device.

13. The method of claim 12, wherein the second advertisement is further based on device-specific data.

14. The method of claim 12, wherein the security token is received from the application using a software development kit incorporated in the Internet-connectable device.

15. The method of claim 12, wherein the security token is generated by a transaction server that corresponds to the application.

16. The method of claim 12, wherein the transaction is a commercial transaction.

17. The method of claim 12, wherein the results of the transaction include customized information based on at least one of device-specific data or user-specific data.

18. The method of claim 12, wherein the results of the transaction include a third advertisement that is based on at least one of device-specific data or user-specific data.

19. The method of claim 12, wherein the results of the transaction include an option to further define the transaction.

20. The method of claim 12, wherein the application is specific to goods and/or services provided by the particular advertiser of the selected advertisement.

21. A non-transitory computer-readable medium storing instructions to be executed by a processor for processing ad server transactions, the instructions causing the processor to perform the steps of:
receiving, on an ad server, data that corresponds to a selected advertisement displayed on an Internet-connectable device that is remote from the ad server, wherein the selected advertisement corresponds to a particular advertiser;

communicating, from the ad server, instructions to the Internet-connectable device in response to the received data, wherein the Internet-connectable device is configured to execute thereon, based on the communicated instructions, an application that is specific to the particular advertiser, and wherein the application is configured to send stored authentication credentials to a transaction server upon execution thereof;

receiving, from the Internet-connectable device, a security token necessary to process transactions on the transaction server, wherein the Internet-connectable device is configured to obtain the security token from the transaction server in response to a successful authentication of the stored authentication credentials sent from the Internet-connectable device to the transaction server via the application;

using the security token to process, via the ad server, a transaction on the transaction server on behalf of the application; and communicating results of the processed transaction to the Internet-connectable device.

22. The non-transitory computer-readable medium of claim 21, wherein the application is an advertiser application that is developed by or for the particular advertiser of the selected advertisement.

* * * * *